United States Patent [19]
Brokaw

[11] Patent Number: 5,634,240
[45] Date of Patent: Jun. 3, 1997

[54] ROLLER COMPONENTS FOR ATACHMENT TO AN ARTICLE OF LUGGAGE

[75] Inventor: Paul E. Brokaw, Euclid, Ohio

[73] Assignee: Master Manufacturing, Inc., Cleveland, Ohio

[21] Appl. No.: 566,243

[22] Filed: Dec. 1, 1995

Related U.S. Application Data

[63] Continuation of Ser. No. 182,277, Jan. 14, 1994, abandoned.
[51] Int. Cl.$^6$ ................................................. B60B 33/00
[52] U.S. Cl. ............................................. 16/30; 248/205.2
[58] Field of Search ........................... 16/30, 29, 31 R, 16/31 A, 40, 45, 43; 248/205.2, 205.3; D8/375, 374

[56] References Cited

U.S. PATENT DOCUMENTS

| | | | |
|---|---|---|---|
| 3,414,093 | 12/1968 | Chostner | 190/16 |
| 3,861,703 | 1/1975 | Gould | 16/30 |
| 4,332,052 | 6/1982 | Remington | 16/30 |
| 5,136,751 | 8/1992 | Coyne et al. | 16/30 |
| 5,515,573 | 5/1996 | Frey | 248/205.2 |

FOREIGN PATENT DOCUMENTS

| | | | |
|---|---|---|---|
| 142740 | 10/1953 | Sweden | 16/30 |

Primary Examiner—Chuck Y. Mah
Attorney, Agent, or Firm—Calfee Halter & Griswold

[57] ABSTRACT

Removably attachable roller components provide an article of luggage or other objects with a rolling capability. The roller components are economical to manufacture, easy to attach to an article of luggage, and strong enough to resist detachment under high impact forces. Further, the assembly of components, while particularly useful for an article of luggage, are adaptable to provide other types of articles with a rolling capability. The roller components include a first coupling member attachable to a selected location on an article, and a second coupling member attached to a wheel subassembly and engageable with to the first coupling member. The first coupling member has one side adapted for attachment to the selected location on the article, and a plurality of hook or loop fasteners extending away from the other side. The second coupling member supports a wheel structure on one side and a plurality of hook or loop fasteners extending away from an opposite side. The hook and loop fasteners on the first and second coupling members are configured to engage, to couple the wheel subassembly to the first coupling member at the selected location on the article.

1 Claim, 4 Drawing Sheets

ROLLER COMPONENTS FOR ATACHMENT TO AN ARTICLE OF LUGGAGE

RELATED APPLICATIONS

This application is a continuation of U.S. application Ser. No. 08/182,277, filed Jan. 14, 1994 now abandoned.

FIELD OF THE INVENTION

The present invention relates to roller components, particularly caster wheel components, for attachment to an article such as a piece of luggage, in order to provide the article with the capability to roll along a surface. Further, the present invention relates to an article, such as a piece of luggage with the roller components secured thereto.

BACKGROUND

Articles of luggage are typically constructed both with and without attached roller structures. An article of luggage which does not have an attached roller structure would normally have hand grips or shoulder straps to enable the article of luggage to be hand carried. An article of luggage which has an attached roller structure provides a traveler with the capability to roll the article of luggage along a surface. That capability is particularly useful where the article of luggage is heavy. An article of luggage with an attached roller structure may also have connecting structure (e.g., an eyelet) which enables a strap to be attached to the article, so that the article of luggage can be conveniently pulled along a surface.

U.S. Pat. No. 4,332,052 discloses another type of roller structure for an article of luggage. Specifically, U.S. Pat. No. 4,332,052 discloses a special base plate attached to an article of luggage, and a wheel which is removably attached to the base plate to provide the article of luggage with rolling capability. Moreover, U.S. Pat. No. 4,332,052 identifies other patents which disclose structures for providing an article of luggage with a rolling capability. Additionally, U.S. Pat. No. 4,332,052 suggests that structure for providing an article of luggage with rolling capability should be economical to manufacture, easy to attach to the article of luggage, and strong enough to resist detachment under high impact forces.

SUMMARY OF THE PRESENT INVENTION

The present invention relates to a new and useful assembly of roller components designed to provide an article of luggage with a rolling capability. The roller components are believed to be economical to manufacture, easy to attach to an article of luggage, and strong enough to resist detachment under high impact forces. Further, the assembly of components, while particularly useful for an article of luggage, may also be useful to provide other types of articles with a rolling capability. Additionally, the preferred embodiment of the present invention allows a piece of luggage, which does not have a rolling capability, to be easily and efficiently transformed into a rolling piece of luggage, without invading the frame of the luggage (e.g., by drilling holes to secure a base plate to the piece of luggage).

According to a basic aspect of the present invention, the roller components include a first coupling member for attachment to a selected location on the article, and a wheel subassembly for attachment to the first coupling member. The first coupling member has one side adapted for attachment to the selected location on the article, and a plurality of hook or loop fasteners extending away from the other side. The wheel subassembly comprises a second coupling member having a wheel structure on one side and a plurality of hook or loop fasteners extending away from the other side. The hook and loop fasteners on the first and second coupling members are configured to engage each other, to couple the wheel subassembly to the first coupling member at the selected location on the article.

With the present invention, the first coupling member is secured, preferably by an adhesive, to a selected location on the surface of the article. The wheel subassembly includes a second coupling member with hook and loop fasteners designed to mate with the hook and loop fasteners on the first coupling member, to couple the wheel subassembly to the article of luggage at the selected location. The use of mating hook and loop fasteners on the first and second coupling members makes for easy attachment of the wheel subassembly to the first coupling member. However, the relatively high resistance to shear provided by hook and loop fasteners, and the configuration of the first and second coupling members, is designed to resist detachment of the wheel subassembly under relatively high impact forces.

Preferably, the first coupling member is disposed against and is adhesively secured to the selected location on the surface of the article. Further, the second coupling member is disposed in facing relation to a base plate of the wheel structure and is fastened to the base plate by a plurality of fasteners. Moreover, the first coupling member is flexible enough to enable the first coupling member to be bent to conform to a curvature in the surface of the article at the selected location, and the second coupling member has hook or loop fasteners which are long enough to engage the hook or loop fasteners on the first coupling member even when the first coupling member is bent to a predetermined degree to conform to a curvature on the surface of the article. Thus, even if the first coupling member is bent slightly to conform to a curvature or radius on an article of luggage, the second coupling member can still provide a full coupling over its entire surface area with the first coupling member.

Furthermore, according to the preferred embodiment, the hook and loop fasteners on the first and second coupling members are disposed over first and second areas on the first and second coupling members, respectively. Moreover, the first area on the first coupling member is larger than the second area on the second coupling member. Thus, the second coupling member can be attached to the first coupling member with the entire second area on the second coupling member located within the perimeter of the first area of the first coupling member. Applicant believes that such a feature, coupled with the high shear resistance of hook and loop fasteners, provides a relatively secure coupling, which resists accidental dislodgement of the coupling members from each other.

Still further, according to the preferred embodiment the fasteners which fasten the base plate of the wheel structure to the second coupling member are disposed within the perimeter of the second area of the second coupling member. Thus, forces applied to the wheel structure are transmitted through the fasteners at locations inward of the perimeter of the second area. Again, applicant believes that configuration minimizes the likelihood of the wheel subassembly becoming accidentally detached because of an unintended impact with a structure.

Also, with the present invention, a set of roller components can be used to provide a first piece of luggage with rolling capability, and a second piece of luggage can be provided with rolling capability by providing additional first coupling members for attachment to the second piece of luggage and using wheel subassemblies from the first piece of luggage to complete the roller components for the second piece of luggage. Moreover, the wheel subassemblies can be conveniently detached from the pieces of luggage, to facilitate storage of the pieces of luggage.

Additionally, according to an additional aspect of the present invention, additional coupling structure is provided to couple a strap to the article of luggage, so that the article of luggage can be conveniently pulled along a surface. A third coupling member, configured similar to the first coupling member, is adapted to be secured to an upper location on the article of luggage. A strap/connector subassembly is adapted to be coupled to the third coupling member by means of mating hook and loop fasteners on the strap/connector subassembly and the third coupling member.

Further features of the capability present invention will become further apparent from the following detailed description and the accompanying drawings.

DETAILED DESCRIPTION OF THE PREFERRED EMBODIMENT

As discussed above, the present invention relates to roller components for attachment to an article such as an article of luggage. In the following detailed description, roller components are described for connection to an article of luggage, to transform the article of luggage into a rolling article of luggage. However, from the following description, the manner in which the present invention can be used in connection with other articles to convert those articles to rolling articles should be apparent to those of ordinary skill in the art.

Figure 1:
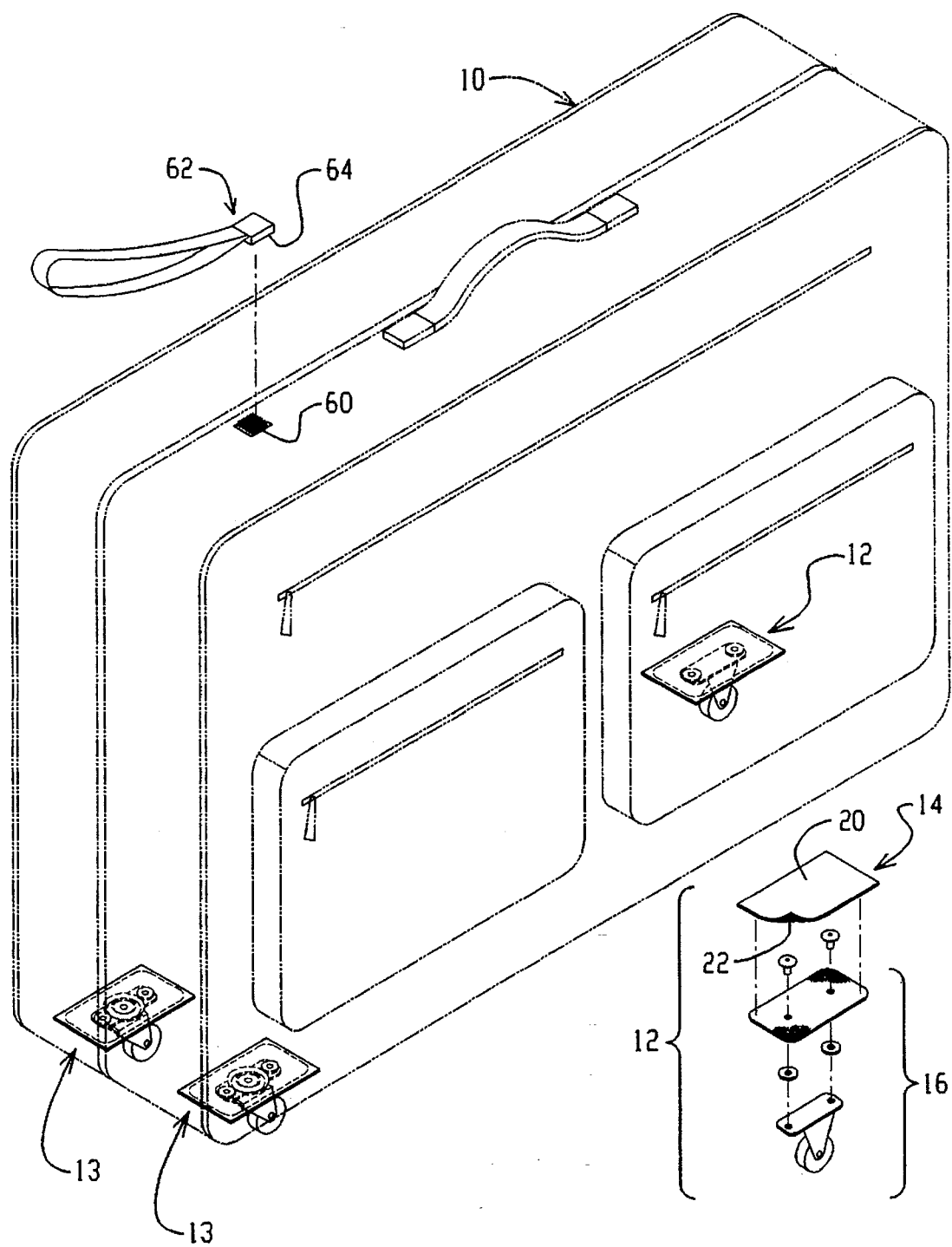
FIG. 1 is a schematic illustration of roller components according to the present invention, for use with an article of luggage.
Figure 2:
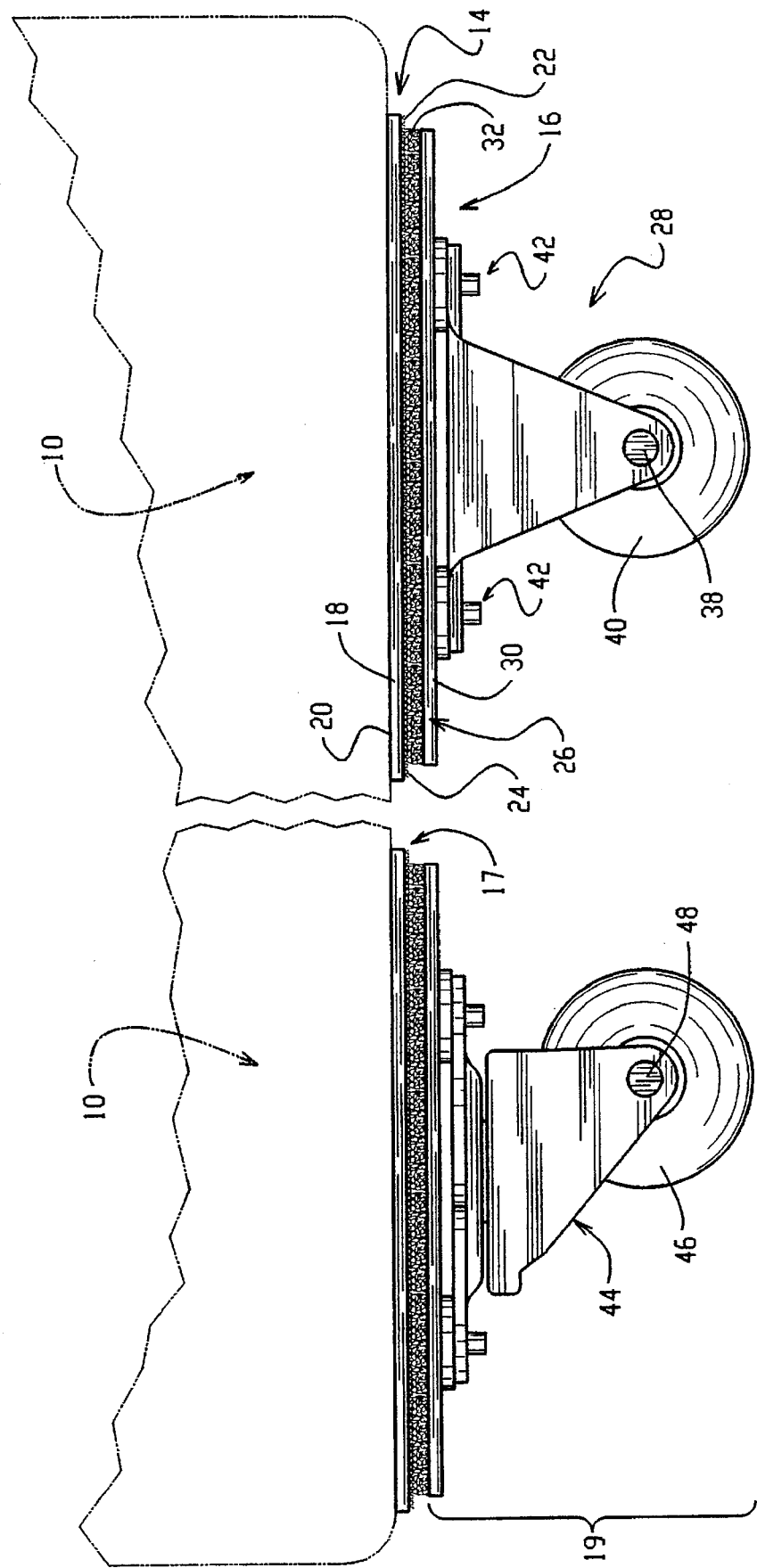
FIG. 2 is a fragmentary, schematic side elevational view of wheel subassemblies according to the present invention secured to an article of luggage.

FIG. 1 illustrates an article of luggage 10 in dashed lines, and several sets of roller components associated with the article of luggage. In FIG. 1, two sets of roller components 12 (one of which is shown in exploded view) are attached to one end of the article of luggage 10, and two sets of roller components 13 are attached to the other end of the article of luggage 10. In the illustrated embodiment, the roller components 12 include "straight rollers", i.e., rollers designed to roll along a straight line. The other sets 13 of roller components include swivel casters which can swivel to allow the luggage to roll in different directions.

Each set of the roller components 12 comprises a first coupling member 14 and a wheel subassembly 16. Each of the first coupling members 14 is adapted to be adhesively secured to a selected location on the surface of article of luggage. Each wheel subassembly 16 is adapted to be secured to a first coupling member 14 in order to couple the wheel subassembly 16 to the first coupling member 14 at the selected location on the article of luggage.

Each set of roller components 13 comprises a first coupling member 17 and a swivel wheel subassembly 19. The first coupling members 17 are identical to the first coupling members 14. Each of the first coupling members 17 is adapted to be adhesively secured to a selected location on the surface of the article of luggage 10. Each swivel wheel subassembly 19 is adapted to be secured to a first coupling member 17, to couple the swivel wheel subassembly to the first coupling member 17 at the selected location on the article of luggage.

The first coupling member 14 comprises a strip 18 of a base material having a first side surface 20 and a second side 22 with a plurality of hook and loop fastening members 24 (in the preferred embodiment the fastening members 24 are hook-type fastening members). The first side surface 20 is adapted to be adhesively secured to a selected surface location on the article of luggage. When the first side surface 20 is adhesively secured to the selected surface location on the article of luggage, the fasteners 24 extend away from the article of luggage. The strip 18 of base material is preferably flexible enough to enable the strip 18 to be bent slightly to conform to a degree of curvature at the selected surface portion of the article of luggage. The first coupling member 14 is preferably made of a material sold by Velcro U.S.A. of Manchester, N.H. under the name P 87 Hook Strip. That material provides the strip 18 in a thickness range of about 0.070 inches and is flexible enough to enable the strip 18 to be bent to conform to a degree of curvature at the selected location on the surface of the article of luggage.

The adhesive that secures the first coupling member 14 to the article of luggage is preferably an adhesive made by Allen Products Corp. of Detroit, Mich. and sold under the name/mark Seal All. Such adhesive is believed capable of adhesively securing the first coupling member 14 to conventional luggage materials such as fabric, soft vinyl, leather, hard plastic.

Each of the wheel subassemblies 16 comprises a second coupling member 26 and a wheel structure 28 fastened to the second coupling member 26. The second coupling member 26 comprises a strip of material 30 with a plurality of hook or loop fasteners 32 extending away from one side (in the preferred embodiment, the fasteners 32 are loop-type fasteners which mate with the hook-type fasteners 24) and the wheel structure 28 is fastened to the strip 30. The second coupling member 26 is preferably made of a material known as A-Stick made by Aplix Inc. of Charlotte, N.C. and is preferably in a thickness of about 0.075 inches. Such a member is relatively stiff and provides a relatively secure mounting for the wheel structure 28. The hook or loop fasteners 32 are made of a material such as Velcro® and are designed to mate with the hook or loop fasteners 24 on the first coupling member 14. The wheel structure 28 comprises a metal base plate 34, a pair of legs 36 formed in one piece with the base plate, an axle 38 extending between and supported on the legs 36, and a wheel 40 rotatable on the axle 38. The base plate 34 of the wheel subassembly 16 faces the strip 30 and is fastened to the strip 30 by a pair of rivets 42. In the illustrated embodiment, resilient, elastomeric pads 33 are disposed between the base plate 34 and the strip 30, to provide some additional force absorbing capability between those members. However, it is also contemplated that with some type of articles the pads 33 may be unnecessary, and the metal base plate 34 can be disposed directly against the strip 30.

Figure 5:
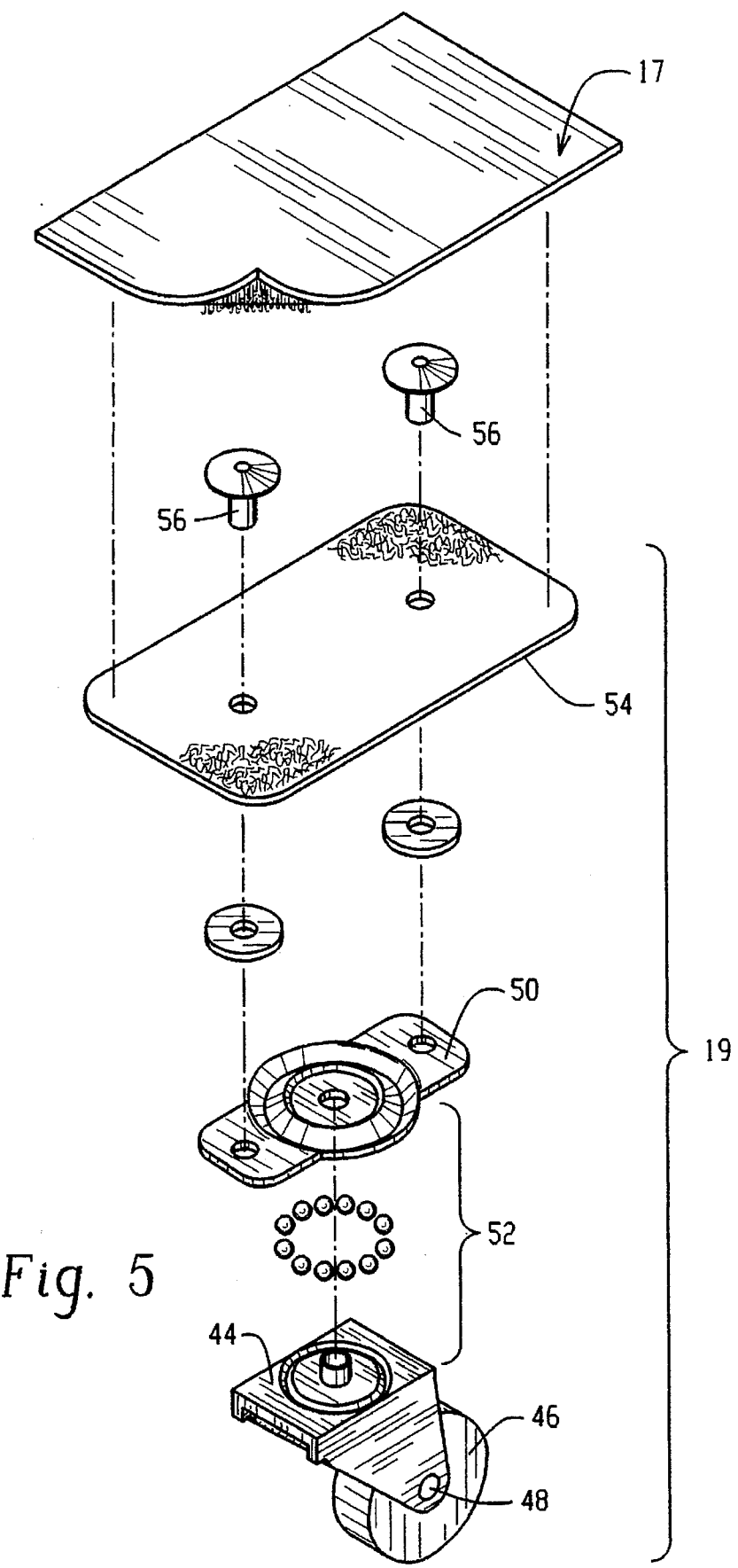
FIG. 5 is an exploded view of another type of wheel subassembly adapted for attachment to an article of luggage according to the principles of the present invention.

The specifics of the swivel wheel subassemblies 19 are shown in FIG. 5. In each of the swivel wheel subassemblies 19, a wheel structure 44 rotatably supports a wheel 46 for rotation about an axle 48. The wheel structure 44 is rotatably supported from a metal base plate 50 by means of a roller bearing structure 52, of known construction. Thus, the wheel 46 rotates about the axle 48 and the wheel structure 44 swivels relative to the base plate 50. The base plate 50 is fastened to a second coupling member 54 (which comprises a strip of the same material used to form the strip 30) by means of a pair of rivets 56. Subassembly 19 is thereby removably attachable to first coupling member 17.

Figure 3:
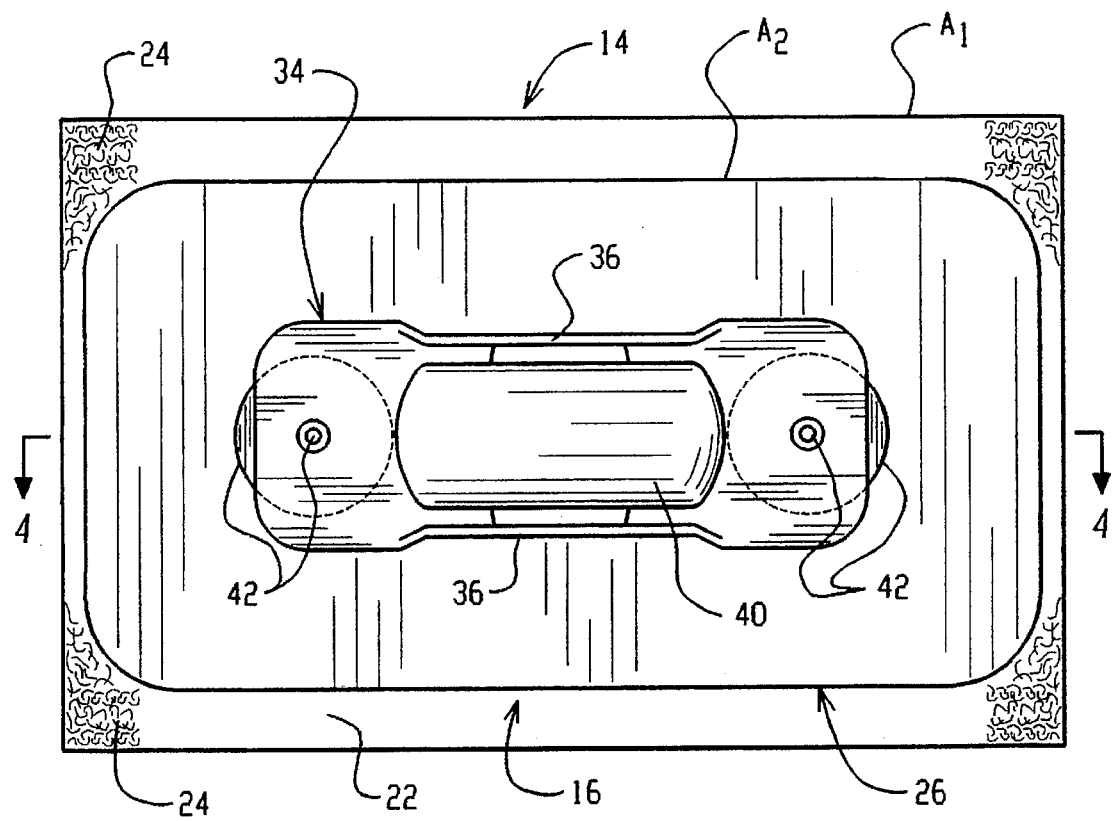
FIG. 3 is a bottom plan view of one of the wheel subassemblies of FIG. 2, secured to a first coupling member configured according to the present invention.

There are dimensional relationships between the first coupling members 14, 17 and the wheel subassemblies 16, 19 which help to resist the wheel subassemblies from being inadvertently detached from the first coupling members 14, 17, in the event of impacts to the wheel subassemblies. For example, the hook-type fasteners 24 on the first coupling member 14 are disposed across a first area whose perimeter is shown at $A_1$ in FIG. 3. The loop-type fasteners 32 on the second coupling member 26 are disposed across an area whose perimeter is shown at $A_2$, which is smaller than the area $A_1$. Also, rivets 42 are spaced inward of the perimeter of the second area $A_2$. With the foregoing configuration, the entire surface area $A_2$ of loop-type fasteners 32 on the second coupling member 26 can be disposed within the perimeter of the area $A_1$ of hook-type fasteners on the first coupling member 14, and the rivets 42 are within the perimeter of the second area $A_2$ of loop-type fasteners 32 on the second coupling member 26. This is believed to provide an advantageous force distribution in the event that the wheel structure 16 is inadvertently impacted against a structure. The nature of the hook and loop fasteners has its highest resistance in shear, and it is believed that by providing the entire surface area $A_2$ of the second coupling member within the perimeter of the area $A_1$ of hook and loop fasteners of the first coupling member 14, and the rivets 42 within the perimeter of the second area $A_2$, there is less likelihood of the second coupling member 26 peeling away from the first coupling member 14 in the event of an inadvertent impact with a structure. Similar dimensional relationships are provided between the first coupling members 17 and the second coupling members 52 of the swivel wheel subassemblies 19.

Figure 4:
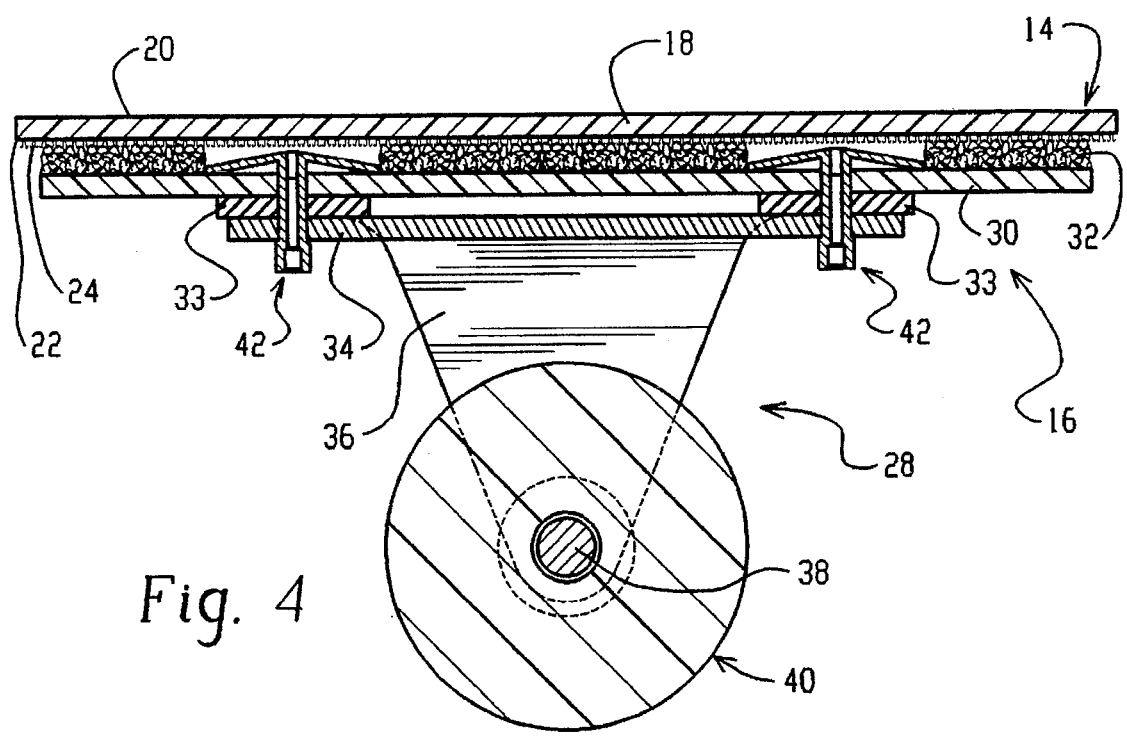
FIG. 4 is a sectional view of the structure of FIG. 3, taken from the direction 4—4.

Still further, according to the preferred embodiment, the loop-type fasteners 32 on the second coupling member 26 are longer than the hook-type fasteners 24 on the first coupling member 14 (see particularly FIG. 4). Thus, if the first coupling member 14 is bent slightly to accommodate a curvature on the surface of an article of luggage, the loop-type fasteners 32 on the second coupling member 26 would be long enough to engage the hook-type fasteners 24 on the first coupling member over the entire second area $A_2$ of the second coupling member. A similar relationship would be provided between the hook and loop fasteners on the second coupling members 52 and the hook and loop fasteners on the first coupling members 17.

Of course, while the foregoing structures and relationships are preferred, modifications are contemplated. For example, with some articles, it may be desirable to change the dimensions of the areas of hook and loop fasteners on the first and second coupling members, so as to facilitate separation of the first and second coupling members. Also, while it is preferred to adhesively secure the first coupling members 14, 17 to surface areas on the article, it may be possible to secure the first coupling members to the article by means of mechanical fasteners such as screws, rivets, etc. Still further, while the preferred embodiment contemplates a set of straight wheel subassemblies 16 and a set of swivel wheel subassemblies 19, all of the wheel subassemblies could be swivel caster wheel or straight wheel subassemblies.

According to a still further aspect of the present invention, additional structure is provided for attaching a strap to the article of luggage. A third coupling member 60, constructed substantially in the same manner as the first coupling members 14, 17 is adapted to be secured to an upper portion of the article of luggage. That upper portion can be the upper portion of the side of the article of luggage or the top of the article of luggage, depending upon the most convenient location found by the user to secure the strap. A strap coupler 62 is adapted to be coupled to the third coupling member 60. The strap coupler 62 comprises a member 64 constructed of the same material as the second coupling member in the wheel subassemblies 16, 19. The strap coupler 62 may have a base plate (not shown) riveted to the member 64 and a metal loop or eyelet (not shown) adapted for attachment to a clip on a strap, secured to the base plate. The third coupling member 60, and the member 64 have mating hook and loop fasteners which enables the strap coupler and the third coupling member to be conveniently attached to each other. Thus, the third coupling member 60 is adhesively secured to a surface location on the article of luggage, and the strap coupler 62 is secured to the third coupling member 60 by the mating hook and loop fasteners, to provide a strong, convenient coupling between the strap coupler and the article of luggage.

Thus, as seen from the foregoing description, the present invention provides an assembly of roller components which can be conveniently connected to an article of luggage, to transform the article of luggage into a rolling piece of luggage. The present invention provides structure that allows the roller components to be selectively located on the article of luggage in an efficient and convenient manner and in a way which is believed to provide a secure coupling between the roller components and the article of luggage. The described roller components can be just as easily detached from an article to which they are secured in the described manner. With the foregoing description in mind, it is believed that various uses or modifications of the present invention will become further apparent to those of ordinary skill in the art.

I claim:

1. A caster assembly adapted for attachment to an article, the assembly comprising:

a first generally planar coupling member having a first surface adhesively attachable to a surface of an article and a second surface of Velcro® material engageable with cooperating Velcro® material;

a second generally planar coupling member having Velcro® material on a surface thereof and engageable with said first coupling member;

a caster base plate attached directly against a planar surface of said second coupling member; and a caster attached to said caster base plate;

wherein said caster base plate is attached directly against said second coupling member by at least one fastener which extends through said caster base plate and said second coupling member.

* * * * *